US007201656B2

(12) United States Patent
Darder

(10) Patent No.: US 7,201,656 B2
(45) Date of Patent: Apr. 10, 2007

(54) METHOD AND APPARATUS FOR SIMULATING GAMES OF CHANCE WITH THE USE OF A SET OF CARDS, INCLUDING A WILDCARD, TO REPLACE USE OF DICE

(75) Inventor: Richard J. Darder, Temecula, CA (US)

(73) Assignee: California Indian Legal Services, Escondido, CA (US)

( * ) Notice: Subject to any disclaimer, the term of this patent is extended or adjusted under 35 U.S.C. 154(b) by 109 days.

(21) Appl. No.: 10/202,222

(22) Filed: Jul. 23, 2002

(65) Prior Publication Data

US 2003/0032471 A1 Feb. 13, 2003

Related U.S. Application Data

(60) Provisional application No. 60/370,263, filed on Apr. 5, 2002, provisional application No. 60/339,067, filed on Dec. 6, 2001, provisional application No. 60/338,977, filed on Dec. 6, 2001, provisional application No. 60/333,973, filed on Nov. 19, 2001, provisional application No. 60/334,695, filed on Nov. 15, 2001, provisional application No. 60/307,507, filed on Jul. 23, 2001.

(51) Int. Cl.
*A63F 13/00* (2006.01)

(52) U.S. Cl. ........................................................ 463/16

(58) Field of Classification Search ............ 463/16–22; 273/138.1, 292, 148 R, 274, 149 R
See application file for complete search history.

(56) References Cited

U.S. PATENT DOCUMENTS 4,355,812 A * 10/1982 McCullough ............... 273/248
4,902,019 A 2/1990 Berman ....................... 273/256
5,431,407 A * 7/1995 Hofberg et al. ............. 273/292
5,676,375 A 10/1997 Pirouzkhah ................. 273/274
5,690,337 A * 11/1997 Somma et al. .............. 273/309
5,772,211 A 6/1998 Nazaryan et al. ........... 273/292
5,918,884 A * 7/1999 DiMuro ....................... 273/292
6,065,752 A * 5/2000 Beltran ........................ 273/274
6,120,031 A * 9/2000 Adams ........................ 273/292
6,179,291 B1 * 1/2001 Vancura ...................... 273/292
6,588,750 B1 * 7/2003 Grauzer et al. ......... 273/149 R (Continued)

OTHER PUBLICATIONS

Casino Games & Equipment; *Dice Cards;* Published by Casino Games & Equipment; © 1987, 1988, 1989 by Hyman P. Silverman; GV 1303 D53x 1989.

(Continued)

*Primary Examiner*—Robert P. Olszewski
*Assistant Examiner*—Tramar Harper
(74) *Attorney, Agent, or Firm*—Knobbe, Martens, Olson & Bear LLP

(57) ABSTRACT

A method and system for simulating games of chance using cards are disclosed using a shuffler to shuffle a set of cards and dispensing one or more cards. Current regulations prohibit certain game operators from using certain games such as traditional craps and roulette. By simulating those games with cards, operators can still provide players with games they recognize and thereby develop excitement and new gaming alternatives for their players, as well as draw new players to such games through their familiarity with the indicia on the cards.

25 Claims, 10 Drawing Sheets

U.S. PATENT DOCUMENTS

| | | | | |
|---|---|---|---|---|
| 6,688,597 | B2 * | 2/2004 | Jones | 273/274 |
| 6,692,003 | B2 * | 2/2004 | Potter et al. | 273/274 |
| 6,749,199 | B2 * | 6/2004 | Boyd | 273/292 |
| 2001/0035604 | A1 * | 11/2001 | Jones | 273/139 |
| 2002/0163125 | A1 * | 11/2002 | Grauzer et al. | 273/149 R |
| 2005/0212213 | A1 * | 9/2005 | Inglese | 273/292 |

OTHER PUBLICATIONS

Casino Games & Equipment; *Supplement Action Craps;* Published by Casino Games & Equipment; © 1988, 1989 by Hyman P. Silverman; GV 1303 D53x 1989 Suppl.

Scarne, John; *Encyclopedia of Games*, pp. 319-321; © 1973; New York, Harper & Row.

Kister, Scott; *BJ Conditions and Specials;* http://www.skister.com/bj; Jul. 22, 2002.

www.WorktheOdds.com; Let-It-Ride Poker; www.worktheodds.com/university/letitrid.php; © 2001-2002 WorktheOdds.com Tamburin, Harry; *Basics of Let It Ride*; http://casino.gambling.net/gamblingGuideRide.shtml; © 2001 by Gambling.net.

Shuffle Master Gaming, Reasons for Card Shufflers; http://www.shufflemaster.com/shufflers.

Ruchman, Peter; *Streetwise Blackjack;* www.casinogaming.com/columnists/blackjack/042300.html; © 1997-2001 Donrey Media Group, CasinoGaming.com.

Johnson, Steve, *Can You Beat an Automatic Shuffler?*; http://www.gamblingnewsletter.com/backissues/gn07202000.htm; Gambling Newsletter, Hot News and Winning Strategies for Gamblers; Issue 20, Jul. 20, 2000; © 2000 ALI Online Inc.

* cited by examiner

Prior Art

500

METHOD AND APPARATUS FOR SIMULATING GAMES OF CHANCE WITH THE USE OF A SET OF CARDS, INCLUDING A WILDCARD, TO REPLACE USE OF DICE

RELATED APPLICATIONS

This application claims the benefit of, and incorporates by reference in their entirety, provisional U.S. Application Nos. 60/307,507, filed on Jul. 23, 2001, 60/334,695, filed Nov. 15, 2001, 60/333,973, filed Nov. 19, 2001, 60/339,067, filed Dec. 6, 2001, 60/338,977, filed Dec. 6, 2001, and 60/370,263, filed on Apr. 5, 2002.

BACKGROUND OF THE INVENTION

1. Field of the Invention

The invention relates generally to the field of games of chance, and specifically to simulating such games with cards.

2. Description of the Related Art

Games of chance are exceedingly popular in many geographic locations and over widely varied socioeconomic groups. Due to various restrictions on the types of games of chance that are allowed in certain locales, some games of chance may not be played in those areas. One such restriction is the limitation by some governments on the practice of games of chance that utilize dice to determine the outcome of the game. Such a restriction prevents those subject to it from playing games such as "craps." In craps, a shooter throws a pair of dice, while players, including the shooter, bet on the various possible outcomes of each throw of the dice. Other games may be restricted by local regulations or practices as well.

Approaches have been provided to attempt to simulate the game of craps utilizing cards, machines that select numbered balls such as those utilized in state lotteries or some bingo games, and random number selection devices such as microprocessors. The difficulty in implementing any of the current systems and methods available is that they do not correctly simulate the odds available in the games they are attempting to simulate. Furthermore, current systems and methods are too cumbersome and interfere with the natural flow of the game they are trying to simulate, or lack the player interaction and therefore the excitement or exhilaration of the game they are trying to simulate. Because of these drawbacks, the current systems and methods lack the interest or drawing power of the games they are attempting to simulate. Therefore, what is needed is a way to accurately simulate many of the existing games of chance including the odds available, the excitement, and the drawing power. Additionally, what is needed is a system or method of incorporating the advantageous paradigms of standard playing cards into existing games of chance while simulating those games of chance to provide an improved gaming experience for players and game operators.

DETAILED DESCRIPTION OF THE PREFERRED EMBODIMENT

Figure 1:
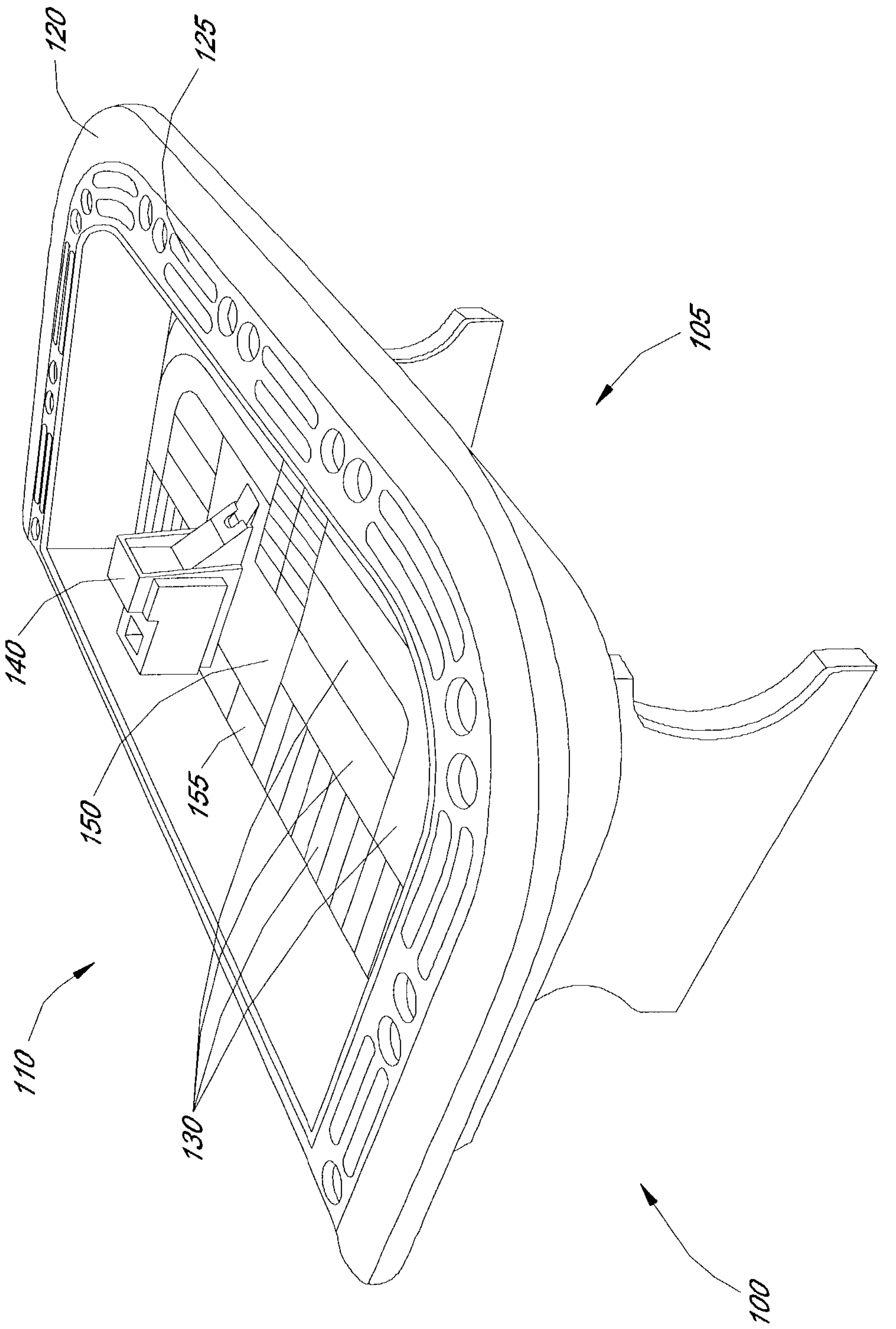
FIG. 1 is a perspective drawing of an example of a game table that can be used in a card game simulating the game of craps.

Embodiments of the invention will now be described with reference to the accompanying figures, wherein like numerals refer to like elements throughout. The terminology used in the description presented herein is not intended to be interpreted in any limited or restrictive manner simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described. This description includes much of the disclosure of related applications U.S. Provisional Application No. 60/307,507 filed on Jul. 23, 2001, U.S. Provisional Application No. 60/334,695 filed on Nov. 15, 2001, U.S. Provisional Application No. 60/333,973 filed on Nov. 19, 2001, U.S. Provisional Application No. 60/338,977 filed on Dec. 6, 2001, and U.S. Provisional Application No. 60/339,067 filed on Dec. 6, 2001, and those applications are incorporated herein by reference for all that they disclose.

For many casino operators, the constant challenge of keeping the attention and interest of the players, and therefore their attendance, depends in large part on maintaining a high level of excitement and comfort in the games they are playing. For many casino operators, this challenge is magnified by regulations preventing the use of certain types of games, thus eliminating the opportunity to run games that many players may have a desire to play due to their familiarity with the games and their excitement. For instance, many casinos are currently prohibited from operating games that determine the outcome, or winning and losing decisions, by using dice. A very popular game that is prohibited by this regulation is the dice game commonly known as "craps." Craps is a very popular game in those locales in which it is allowed to be played, and therefore, there is a large demand for it in other locales because so many potential players have developed a familiarity with the game and the excitement it provides.

In addition, another challenge for casino operators is to generate new games that might develop excitement in new players and generate new streams of revenue. If an operator can draw in players who want the gaming excitement provided by existing games but may be intimidated by the amount of knowledge required to begin playing these games, then that casino would recognize a new stream of revenue. Operators can capitalize on elements from other games that might be familiar to these potential players to allow them to gain confidence and comfort in the new game, thereby expediting the increase in excitement in these players.

Traditional playing cards are remarkably popular and most people have at least a cursory familiarity with the suits and card denominations used in card games. Therefore, it may be advantageous to use playing cards to simulate games prohibited by local regulations both to generate interest of those who are familiar with the games being simulated and to develop new revenue streams in potential players looking for new games to play. Some games that may be simulated using cards include, for example, craps, roulette, and keno, but virtually any game of chance can be simulated to some degree using cards as the determining mechanism.

Craps

For the game of craps utilizing cards instead of dice, several methods of developing determining outcomes, which in this case are cards dealt instead of dice rolled, are available. Special cards can be used that have all possible variations of dice outcomes on them. These cards can be shuffled each time an outcome is required and then one card can be dealt. Alternatively, standard playing cards ace through six can be used. With this second alternative there again are several embodiments available. For instance, one could shuffle two separate decks of multiples of six cards and deal them out separately, or one could deal two cards from one deck. If this second option is utilized, the odds may be corrected by reshuffling the cards after each card is dealt, or a wildcard can be placed in the deck to take the place of the one already dealt. In this manner, the odds of the game are correctly maintained while allowing the cards to be dealt from one deck. If the wild card, which might be a joker, is dealt first, a default rule may be utilized to restart the game. This default rule can be any rule the game operator thinks will develop interest and excitement while the deck is reshuffled.

One choice of such a rule is the use of a special joker bet that can be added to the table to allow players to bet on the joker being drawn. In this case the outcome of a joker being drawn is taken as a possible outcome while the cards are shuffled for the next draw. By using playing cards, suits are provided in addition to the normal numbers. The standard suits, namely hearts, diamonds spades and clubs, or any other suits may be used. The use of suits calls to mind the various hands possible in card games and, therefore, allows the game operator to add new bets to the craps table, and while any hand can be used for betting, a few examples of such bets will be described below. By using suits, such as the traditional four, in addition to the numbers on cards, each set of six possible numbered cards in the four suits provides a deck of twenty-four cards. By using more than one set of cards the game operator can lower the odds that the joker will be drawn. This can be done to manipulate the odds for bets that the joker will be drawn, or to lower the probability that the joker will be drawn first, thereby halting play on all bets but the joker bets. The more sets of 24 cards that are used results in lower chances of drawing the joker on any particular draw. Additionally the cards can be separated into the different suits and a player may choose which suit or suits are to be played for that particular hand, thereby simulating the player interaction of the traditional craps game.

The card game simulating the game of craps can be played on the table illustrated in FIG. 1. In this embodiment, the table 100 has a player side 105 and a dealer side 110. The player side 105 has a rail 120, which can be a cushion if desired to allow players to rest against the table 100. In this embodiment, the player side 105 also has several containers 125 (that are located around the perimeter of the player side 105) in which chips or other items can be stored. The playing surface of the table 100 has many portions to it. In addition to the traditional betting areas 130 that are available, the table 100 illustrated in FIG. 1 includes a card shuffler 140. The shuffler can be an automatic shuffler or may simply be an area for the dealer to shuffle the playing cards. This location is for illustration only and the shuffler 140 can be located elsewhere on the table or off of the table.

As mentioned before, the use of cards for determining each outcome can be accomplished a variety of ways and the type of shuffler 140 or method of shuffling can be different as well. If an automatic card shuffler 140 is utilized as illustrated in FIG. 1, the process of shuffling can be sped up thereby lowering delay time between card dealings. This minimization of delay time is amplified when multiple sets of cards are used. For example, if 73 cards are used, three sets of cards numbered from ace through six in each of the four traditional suits and a joker, then a dealer can simply place the 73 cards in the shuffler and quickly draw cards for the next playing hand. Some embodiments include an automatic card shuffler 140 that continuously shuffles the cards within it and each time one or more cards are dealt from it those cards can be put back in the shuffler 140 after they are used, for shuffling back into the other cards. Certain embodiments can also employ various indicators (not shown). One such indicator can be used to inform the players and dealers that all of the cards are present in the shuffler 140, which may inspire confidence in the players as to the fairness of the game. Another indicator that is used by certain embodiments indicates when the shuffling of the cards is complete. This can signal to the dealers when the next cards can be dealt. The indicators may be a light, or an alphanumeric display, or any sort of display capable of indicating a certain amount or the condition of the cards in the shuffler 140. One embodiment of the automatic shuffler will include one or more colored lights (not shown) to function as the indicator.

Figure 2:
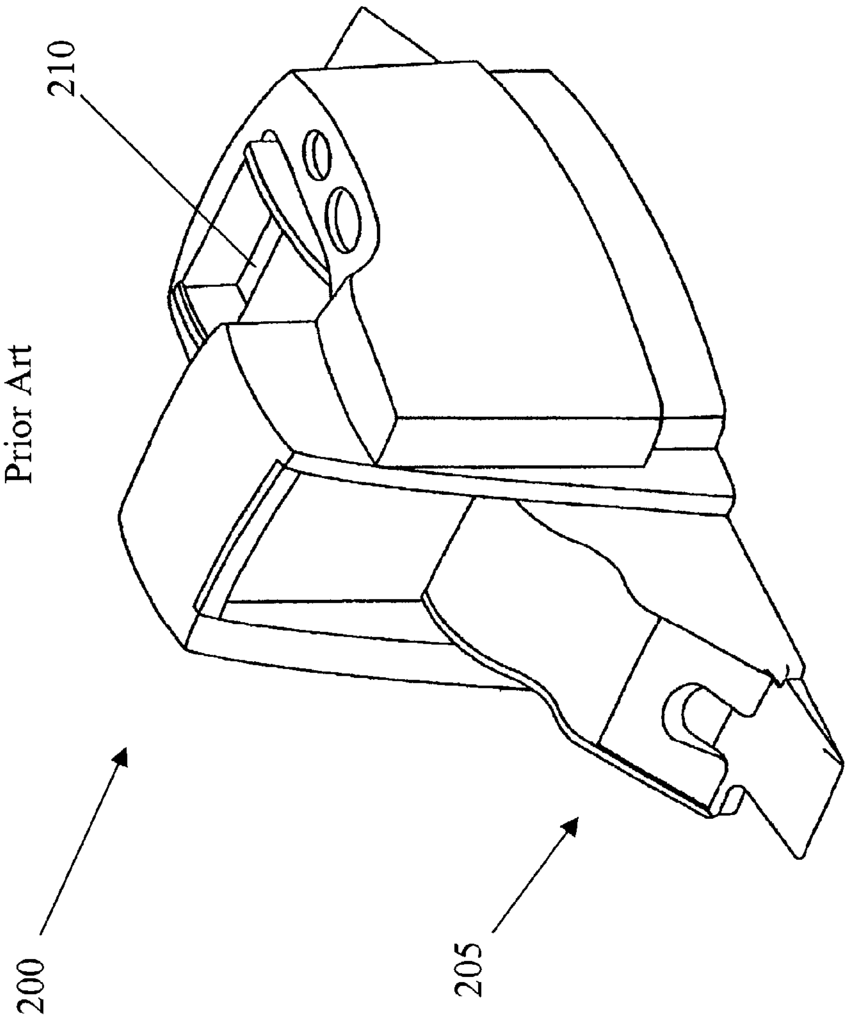
FIG. 2 is a perspective view of an automatic card shuffler from the prior art that can be utilized in one embodiment.

FIG. 2 is a perspective view of an automatic card shuffler 200 described in the prior art that can be utilized. The shuffler 200 illustrated in FIG. 2 is described in U.S. Pat. No. 6,254,096 to Grauzer, et al. ("Grauzer") and the entire disclosure of Grauzer is incorporated herein by reference. Although the shufflers 200 described by Grauzer are specifically described and referenced herein, any card shuffler can be used for embodiments of all the games listed herein, and alternatively, embodiments of the invention can employ traditional hand-shuffling and dealing. Certain embodiments of the shufflers 140, 200 illustrated in FIG. 1 and in FIG. 2, respectively, will dispense cards when directed to do so by the dealer to a card dispensing area 205. The cards may be dispensed individually or in groups of more than one. In some embodiments, cards will be dispensed in groups of four to six cards and the players can determine which two of the cards will be dealt for the hand. The selection of the cards can be many different ways including for example, merely choosing, rolling a six sided cube with two each of the numbers one through three on its six sides, using a "pai-gow" poker style rolling cup and the cube just described, using a "chuck-a-luck" cage with the cube described above, using "bingo" style balls numbered one through three and an appropriate selector such as a cage, or any other way of choosing which of the cards will be played. By allowing the players to select which two of the four to six cards that are to be dealt, player interaction analogous to the rolling of the dice in craps is achieved, and therefore, player excitement is developed. After the cards are selected and dealt, those and the rest of the cards that were dispensed are returned to the shuffler card receptacle 210 for shuffling prior to the next cards being dealt. Alternatively, two cards may be dealt by the shuffler 200 for each hand, and then returned to the shuffler when the bets are paid and collected or the hand is otherwise completed. This is done to repopulate the set of cards, thereby ensuring correct odds with every deal.

Figure 3:
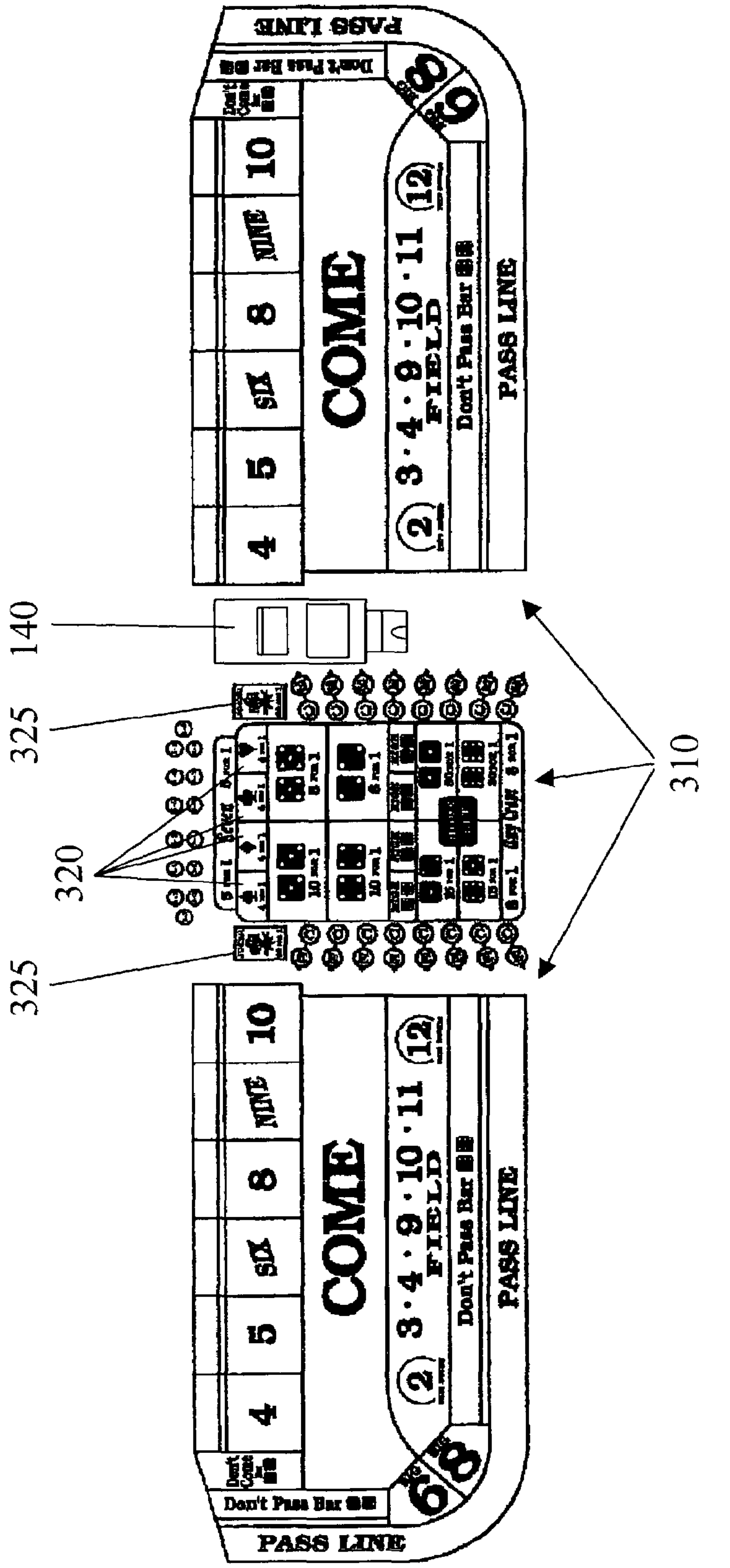
FIG. 3 is a top view drawing of an example of a game table that can be used in a card game simulating the game of craps.

The layout of the game is relatively close to that of regular craps and can be described with reference to FIG. 3, which illustrates one embodiment of a table layout that can be used to simulate the game of craps with cards. In some embodiments, the layout is substantially the same as a regular craps layout. FIG. 3 illustrates a table having the traditional betting areas 310 available for standard craps betting and the use of one shuffler 140. Many embodiments will include bets typically found in casinos for traditional craps such as, Pass Line bets, Come bets, Don't Pass bets, Don't Come bets, Field bets, Hardway bets, and Place bets among many others. In addition, FIG. 3 illustrates alternate betting areas 320, 325 that are used is some embodiments, and FIG. 3*a* includes another alternate betting area 340. These non-traditional bets are possible because of the use of playing cards with suits or other indicia and a joker, if it is used. The suit betting area 320 is used in certain embodiments for betting on the dealt cards representing a certain one of the suits of cards used. There are several variations available for such a bet and it is up to the operator of the game to choose which ones will be used in their games. For instance, the bet can represent the suit of the first card dealt, the second card dealt, that both cards dealt will be that suit, that all of the cards dispensed for that hand by the shuffler 140 are of that suit, or any other bet based on the suit or color or other indicia on the card if other types of cards are used. Additionally, because there exist many different methods of dealing cards, it is possible to bet on the top card or the last card ejected by the shuffler 140 should the shuffler eject all of the cards after a hand is dealt. An example of such a bet is further described below with respect to the game of roulette.

Figure 3A:
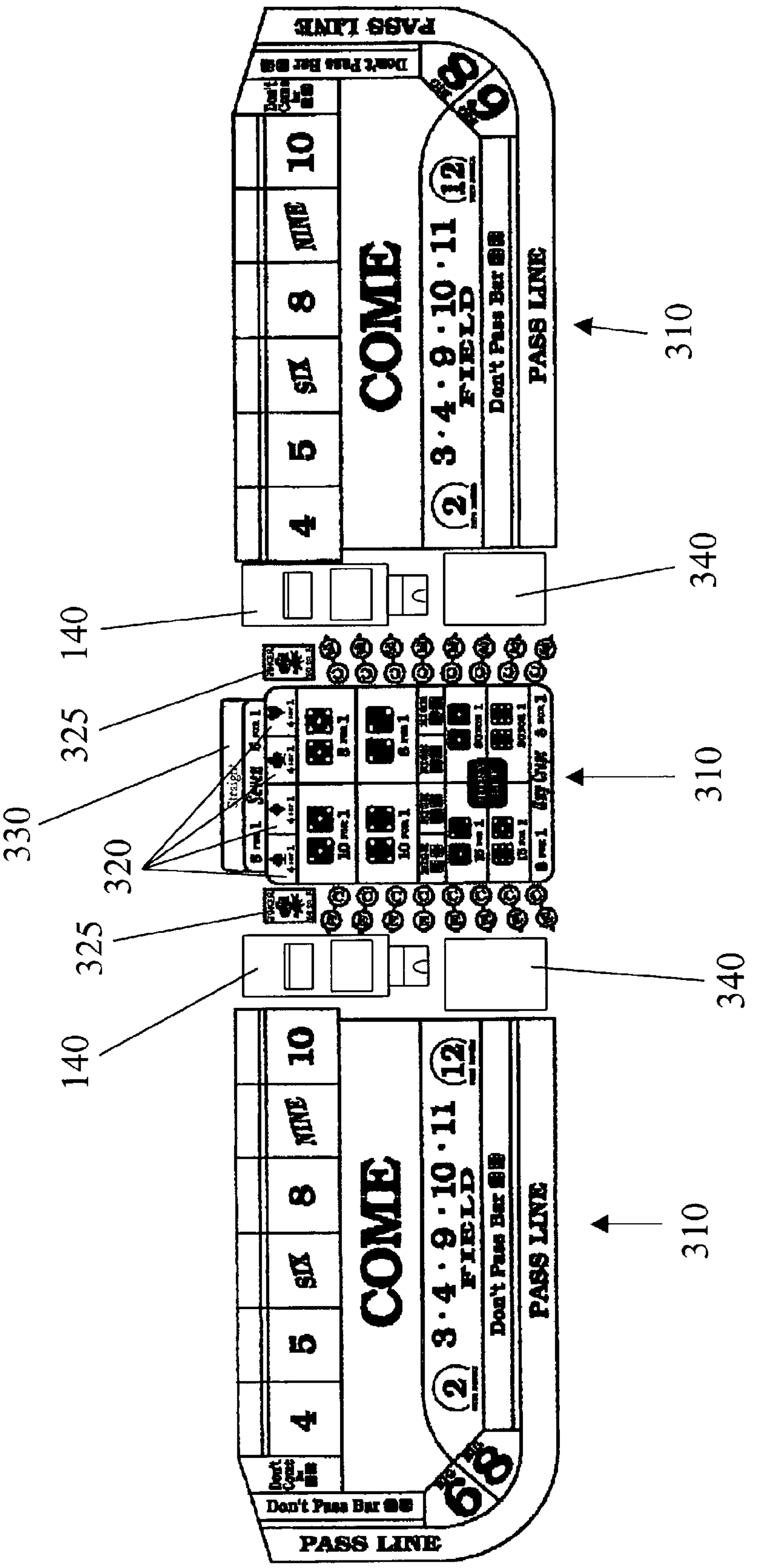
FIG. 3*a* is a top view drawing of an alternative game table that can be used in a card game simulating the game of craps.

Still referring to FIGS. 3 and 3*a*, another alternate area for betting is the joker betting area 325 if one or more jokers, or other wildcards, are used. This area allows players to bet on certain outcomes that include the joker being dealt. Again, this may include many variations such as the joker being the first card dealt, the second card dealt, or any of the multiple cards dealt by the shuffler 140. These alternate bets are possible by the use of cards having more indicia on them than just a value from one through six. Additionally, a game operator may allow other non-traditional bets that are used in other games besides craps and such bets would be indicated by corresponding betting areas being added to the table layout. Such bets may include that a certain number of the next cards dispensed or dealt will represent a flush or a straight or even a straight flush, whether they come in a particular order or not. Any possible bets that can be tracked can be used because the cards are dealt one at a time instead of in pairs as with the dice thrown in traditional craps. The number of cards used will determine the odds of any of these outcomes, and they may be paid in any way seen fit by the operator, such as at a fixed rate or as any progressive jackpot known in the art. By using such cards players can bet on other things that are familiar to them and thereby, this may add excitement to the game.

The game may be played as a traditional craps game or some variation of it as determined by each game operator to add to the revenue generated by the game or to add to the popularity of the game. In some embodiments, with reference to but not limited to the disclosures of FIGS. 1, 3, 3*a*, a shooter will be assigned for the next play, or "come out" hand. Bets will be placed for various outcomes in the betting areas 310, 320, 325 such as pass line bets, don't pass line bets, joker bets suit bets or any other bets that can be played at this stage. The hand is dealt according to the embodiment being employed. If the dealer is dealing from two separate sets of cards, whether they are shuffled automatically or not, the dealer will either deal the cards one at a time or both at the same time depending on the type of betting allowed in the game, as described above. If the dealer is dealing from one hand, he will deal the selected cards to be played. The selected cards will be determined as above, where they can be merely the top two cards on the deck if shuffling by hand, or selected from the cards dispensed by the shuffler 140. If more than two cards are dispensed by the shuffler, any of the selection options described above to allow the shooter to select which cards are to be played will be employed. The hand is then dealt and the outcome of the two cards determines what bets are paid and which bets are lost as well as whether a "point" has been established or not. If a joker is the first card dealt, the joker bets are paid and the rest of the bets are pushes; the hand is essentially a dead hand except for the joker bets. If the joker is the second card dealt, it either replaces the first card dealt or its value and therefore, a pair of whatever was the first card dealt is the outcome for the hand.

The embodiments of craps described in the preceding discussion represent only a few of the embodiments that can be used and any variations of the preceding elements can be used by those skilled in the art to implement any particular embodiment. Other embodiments include the use of various numbers of cards by the game operator to affect the odds and the playability of the game, or the use of multiple shufflers or multiple sets of cards being shuffled while the current cards are being dealt or any other possible combination of the elements described above. Additionally, simulating the game of craps with cards can be done on a video game such as a personal video game, a game system or machine, a video poker machine or a video slot machine. All of the varieties discussed above may be programmed into a video game that simulates the game of craps using cards. Many of these embodiments will utilize a system having one or more microprocessors, as described below, and memory along with a video output and an input mechanism. These elements may be described as modules for executing the functions necessary to carry out the embodiments described herein as will be described below.

Roulette

Figure 4:
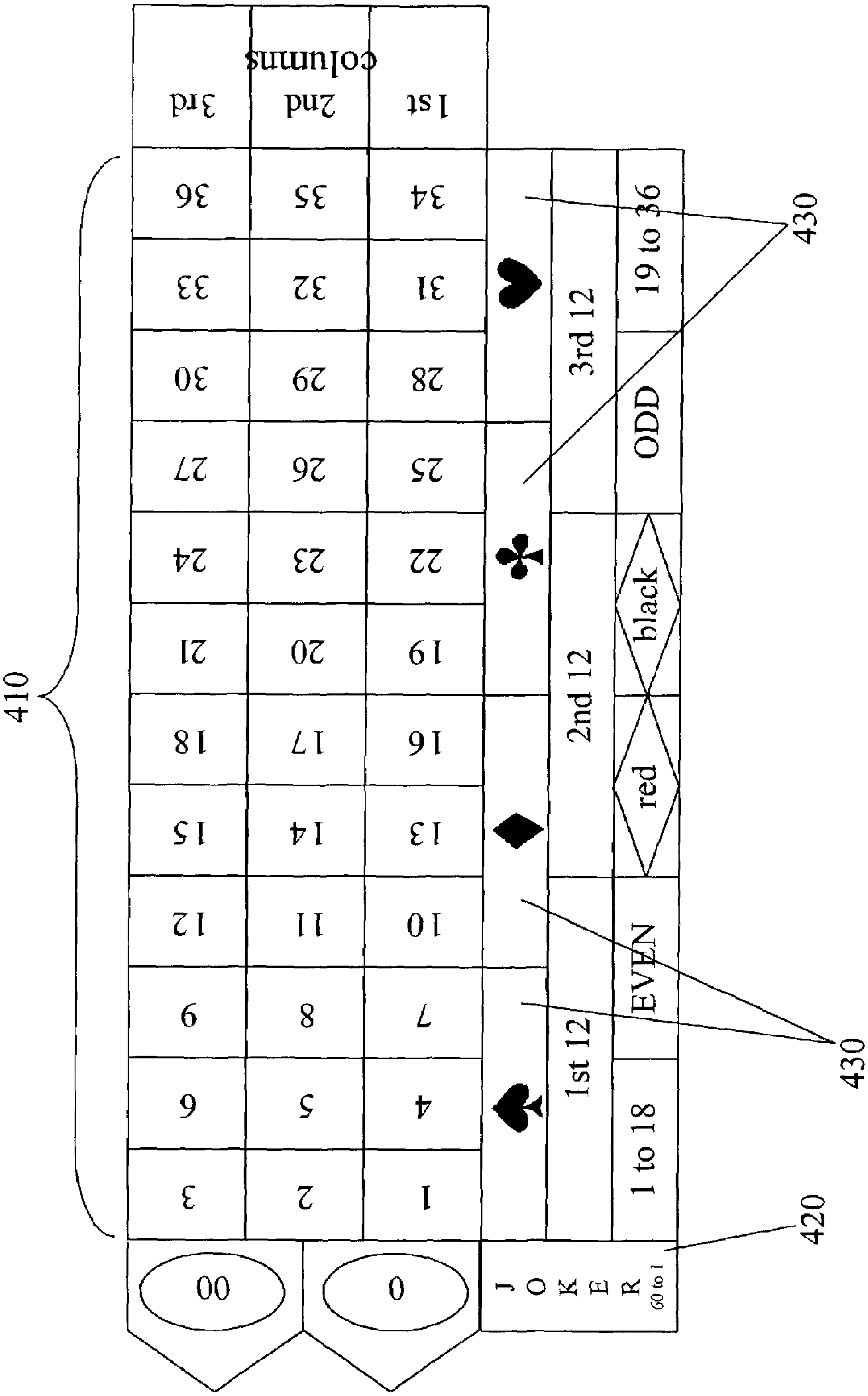
FIG. 4 is a top view drawing of an example of a game table that can be used in a card game simulating the game of roulette.
Figure 4A:
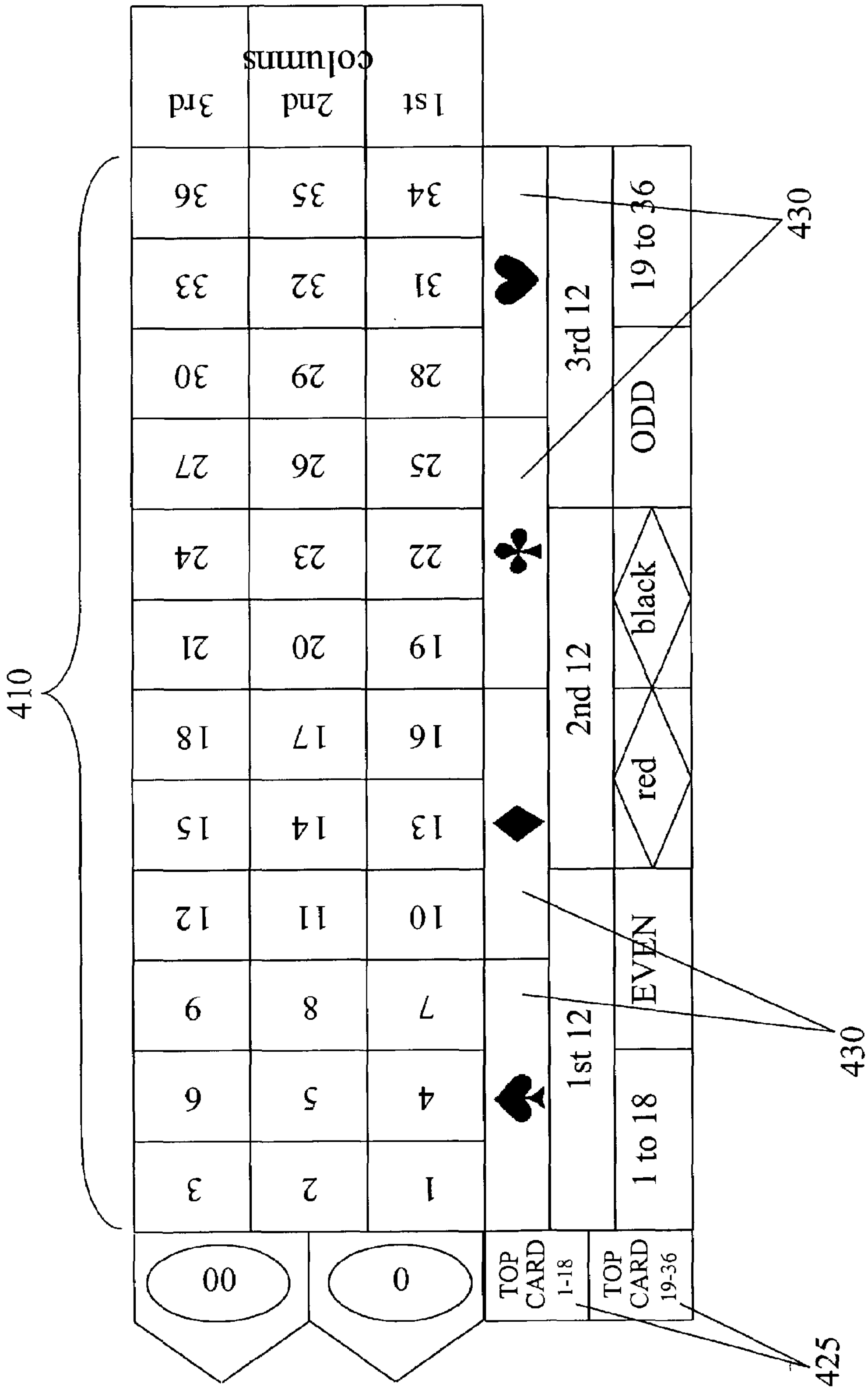
FIG. 4*a* is a top view drawing of an alternate game table that can be used in a card game simulating the game of roulette.

Another game of chance that can be simulated using cards is roulette and FIG. 4 is a top view drawing of an example of a game table 400 that can be used in a card game simulating the game of roulette. FIG. 4*a* is a top view drawing of an alternate game table that can be used. In traditional roulette, a wheel with thirty-eight sections is spun and a ball is dropped into the spinning wheel. When the ball comes to rest in one of the sections, a winning section is thereby provided and the bets that indicate such an outcome are paid and the bets not indicating such an outcome are lost.

Some issues with the traditional roulette method exist however. There is always the possibility that the wheel is fixed such that the outcome is not always entirely random or somehow influenced by the dealer. Such irregularities can be removed by using a shuffled set of cards rather than the roulette wheel and ball. As mentioned previously with respect to the game of craps, any variety of different sets of cards can be used to simulate the use of the roulette wheel with the numbers 410 on the betting table 400 being appropriate for the number of cards used in the game. For instance, for the table 400 illustrated in FIGS. 4 and 4*a*, one or more sets of cards numbered one through thirty-six, a zero, a double zero and one or more jokers, or wildcards, can be used to support the bets available on the table.

The cards that are used may contain additional indicia such as the four standard suits in traditional playing cards. By the use of such indicia and one or more jokers, additional bets are available in this game as they are for craps. A joker betting area 420 is available as an outcome in FIG. 4, and in FIG. 4*a* one or more top card betting areas 425 are available in embodiments that utilize an automatic shuffler that ejects all of the cards when the hand is over. The top card is the last card ejected by the shuffler and in the embodiment illustrated, bets can be placed as to whether that card will be numbered in the upper half or the lower half of the non-zero numbered cards in the deck. Although two top card bets 425 are indicated in FIG. 4*a*, the game operator may choose any known bet to be utilized as the top card bet. Also available are suit betting areas 430 where players can bet that the outcome will belong to one of the suits. As mentioned before, because only one card is dealt at a time, any number of traditional playing card hands can be used for betting as well. These hands may include any hand available in standard card games or in other games such as, multiple numbers of a particular value, straight, flush, or any other hand or combination can be used.

Additionally, many different ways of shuffling the cards may be used. Either a dealer may shuffle the cards used by hand, or one or more automatic card shufflers can be used. In some embodiments an automatic card shuffler (not shown) can be used that either dispenses one card at a time or multiple cards at a time. As described above, player interaction can develop more excitement in the players than when it is absent and, therefore, some embodiments will include such player interaction. Some embodiments will have automatic card shufflers dispense multiple cards and a player will select which card is played. This selection can be by any of the means described above for the game of craps including means such as a chuck-a-luck cage with a cube having two each of the numbers one through three on its six sides, a pai-gow poker cup for rolling a similar cube, numbered bingo type balls and a selector for them, or any other type of selector. Alternatively, the player could just select the card to be played or could roll a die or use any other suitable means of selecting which card is played. If, for instance, the player selects the number two, then the second card would be the card that is played to determine the winning and losing outcomes.

Other dealing methods for certain embodiments allowing for fast dealing-game pace but eliminating player interaction and the additional random selection of a card out of the dealing shoe, is to designate the first card out of the shoe cavity as the winning hand or to only dispense one card to the shoe. With this dealing method, the winning card does not have to be immediately placed back into the shuffler if a joker is used, as the joker becomes a wild card and takes the value of the first card drawn to effectively keep the card population statistically correct (1/38 probability). The remaining cards in the shoe cavity remain in the shoe cavity for a second hand, the second card can then be dealt and exposed as the second winning number. After two hands, all of the cards are placed back into the shuffler for continued game play. In certain embodiments, if the joker is dealt on the first hand, joker bets win and no other action takes place and the second card dealt becomes the winning hand for the rest of the table. In similar embodiments, if the joker is the second card dealt, the joker bets win and no other action takes place. In other embodiments the joker may be treated like any other card and the rest of the bets lose, while the cards in the shoe are returned to the shuffler. After a card is dealt, and a subsequent card is dealt if the embodiment allows it, all cards are then removed from the shoe cavity and placed back into the shuffler to repopulate the set of cards.

A sample payout schedule for various traditional and non-traditional bets that is used in certain embodiments is set forth below:

Traditional Bets

Inside Bets:

1. Straight Up or One Number Bet: Pays 35 to 1. Wager on any number from 1 to 36, or 0 and 00.

2. Two Numbers: Pays 17 to 1. Place the chip (or chips) on the line between two numbers.

3. Three Numbers: Pays 11 to 1. To choose a row of 3 numbers position a bet on the line that separates the "inside" and "outside" areas.

4. Four Numbers: Pays 8 to 1. To make this bet, place a wager on a four-number intersection.

5. Five Numbers: Pays 6 to 1. A wager to bet the 00,0, and first row of three numbers.

6. Six Numbers: Pays 5 to 1. This bet is placed between two three-number rows on the line that divides the "inside" and "outside" fields.

Outside Bets:

7. 12-Number Column Bet: Pays 2 to 1. A wager in one of the spots marked "2-1" at the opposite end of zero and double zero.

8. 12-Number Numerical Bet: Pays 2 to 1: Choose between 1st, 2nd, and 3rd twelve. A bet on numbers 1 to 12, 13 to 24, or 25 to 36 respectively.

9. 18 Numbers Red/Black: Pays 1 to 1. To make this wager, place chip(s) on the red or black diamond.

10. 18 Numbers Odd/Even: Pays 1 to 1.

11. 18 Numbers High/Low: Pays 1 to 1.

Non-Traditional Outside Bets:

12. Suit Bet: Betting that one of four suits will be drawn—9 number bet: Pays 3 to 1.

13. Joker Bet: Using one Joker, the odds are 1/77 for two sets of the set of cards 500 illustrated in FIG. 5. The recommended payout is 60 to 1.

14. Top Card Bet: A bet that the last card ejected will be 1–18 or 19–36. Pays 1 to 1. Certain embodiments will eject the cards face up to facilitate this betting.

As an alternative, the game can be designed as a video game or a video slot game in addition to a house banked casino card game. This would allow the same variety of bets, or plays if it is a non-betting version, available on the table layouts described above or any other layout to be used for the more private setting of a video slot machine, which are popular with those who feel more comfortable with such machines than with the fast-paced gaming tables. Any of the games simulating games of chance with cards can be further simulated on a video poker machine for this same reason. As with the embodiments described above, such electronic embodiments may consist of various functional modules fulfilling the various functions of the embodiment as described below.

Figure 5:
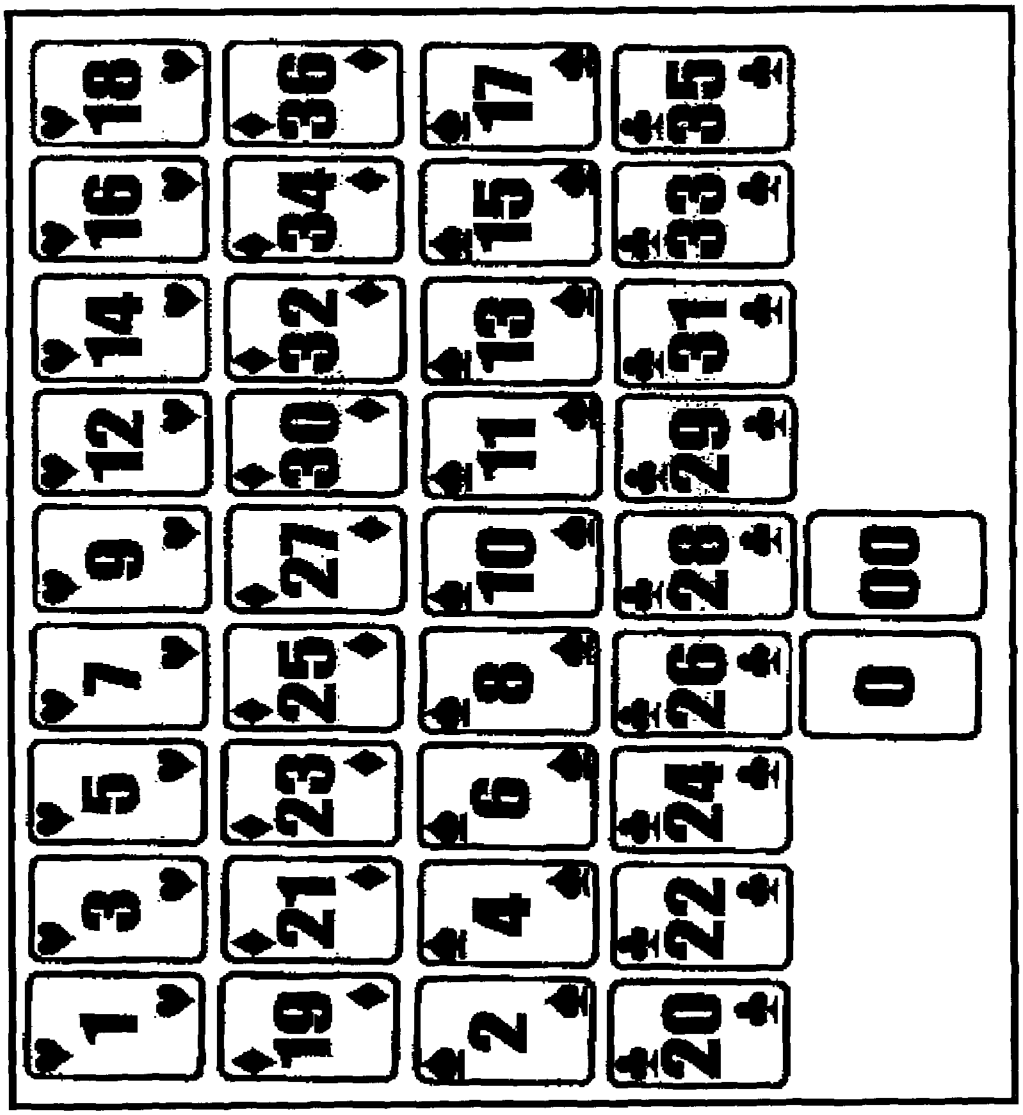
FIG. 5 is a top view drawing of an example of a set of cards that can be used in a game utilizing cards to simulate roulette.

FIG. 5 illustrates one embodiment of a set of cards 500 that can be used for simulating roulette with cards. The set of cards 500 illustrated does not include a joker and embodiments utilizing a joker would add such a card to the set. The set of cards 500 illustrated in FIG. 5 shows that of the cards numbered one through thirty-six, four sets of nine of those cards include each of the four suits of traditional playing cars to allow the unique betting available for use in embodiments using such indicia. While one possible distribution of the suits on the particular numbered cards is illustrated in this exemplary set of cards 500, any distribution can be used and the betting odds can be adjusted if that distribution is not equal. Also, while the set of cards 500 illustrated in FIG. 5 only contains 38 cards, 39 if a joker is added, any number of sets of cards 500 can be used and the operator may choose to alter the numbering on the table and on the cards 500 to meet whatever preferences are determined to be desired.

Keno

Another game of chance that can be simulated using cards is keno. Keno is very popular and uses random number generation to determine winning and losing numbers and combinations of numbers. Typical games include drawing as many as thirteen or more numbers from a group of numbers one at a time with the outcome of the selected numbers determining the winning and losing bets. Before the numbers are drawn, players place bets on various outcomes and after the numbers have been drawn their bets are tallied and the player is paid or not based on how many bets were winning ones and how many were losing ones. As with roulette and craps described above, the bets available in keno can be increased if cards are drawn to select the numbers and in addition to the numbers being drawn other indicia are included on the cards. As described previously, embodiments using suits increase the variety of bets that can be used by including suit based bets such as flushes among others. A special set of cards can be used to simulate the traditional game of keno, with or without the extra indicia, or a standard set of playing cards may be used. In embodiments using standard playing cards, the resulting values selected would be different as there are four suits of only thirteen different values of cards in a standard playing deck. However, the different values determined by using standard playing cards allow unique bets that are familiar to players but are not available in traditional keno. Such bets include a straight flush, a royal flush, pairs, three and four of a kind, and full houses as well as many other bets.

If the cards are selected from a standard deck of cards, the number of possible combinations of 13 sets of numbers drawn is governed by the equation C=(52 choose 13) or 52!/((52−13)!*13!)=635,013,559,600. From this the possibility of any particular event occurring can be decided and the game operator can select the payout on the odds desired to encourage people, yet maintain a substantially acceptable rate of return for the operator. The probability of getting any particular outcome is computed by dividing the total number of ways of getting an outcome divided by the total possible outcomes given above. So for example, the odds of picking all 13 cards drawn is over 635 billion to 1, while the odds of picking 6 of the numbers right should be [52!/((52−6)!*6!)]/635,013,559,600 or about 31,191 to 1.

An example of a payout schedule is given by the following:

| Results Drawn | Results Picked | Prize ($) |
|---|---|---|
| 1 | 1 | 3 |
| 0 | 1 | 0 |
| 2 | 2 | 12 |
| 1 | 2 | 0 |
| 0 | 2 | 0 |
| 3 | 3 | 45 |
| 2 | 3 | 1 |
| 1 | 3 | 0 |
| 0 | 3 | 0 |
| 4 | 4 | 200 |
| 3 | 4 | 5 |
| 2 | 4 | 0 |
| 1 | 4 | 0 |
| 0 | 4 | 0 |
| 5 | 5 | 1,000 |
| 4 | 5 | 20 |
| 3 | 5 | 0 |
| 3 | 5 | 0 |
| 2 | 5 | 0 |
| 1 | 5 | 0 |
| 0 | 5 | 0 |
| 6 | 6 | 6,500 |
| 5 | 6 | 75 |
| 4 | 6 | 0 |
| 3 | 6 | 0 |
| 2 | 6 | 0 |
| 1 | 6 | 0 |
| 0 | 6 | 0 |
| 7 | 7 | 15,000 |
| 6 | 7 | 750 |
| 5 | 7 | 20 |
| 4 | 7 | 0 |
| 3 | 7 | 0 |
| 2 | 7 | 0 |
| 1 | 7 | 0 |
| 0 | 7 | 0 |
| 8 | 8 | 25,000 |
| 7 | 8 | 5,000 |
| 6 | 8 | 100 |
| 5 | 8 | 5 |
| 4 | 8 | 0 |
| 3 | 8 | 0 |
| 2 | 8 | 0 |
| 1 | 8 | 0 |
| 0 | 8 | 0 |
| 9 | 9 | 25,000 |
| 8 | 9 | 10,000 |
| 7 | 9 | 650 |
| 6 | 9 | 50 |
| 5 | 9 | 5 |
| 4 | 9 | 0 |
| 3 | 9 | 0 |
| 2 | 9 | 0 |
| 1 | 9 | 0 |
| 0 | 9 | 0 |
| 10 | 10 | 25,000 |
| 9 | 10 | 10,000 |
| 8 | 10 | 7,500 |
| 7 | 10 | 200 |
| 6 | 10 | 5 |
| 5 | 10 | 0 |
| 4 | 10 | 0 |
| 3 | 10 | 0 |
| 2 | 10 | 0 |
| 1 | 10 | 0 |
| 0 | 10 | 0 |
| 11 | 11 | 25,000 |

-continued

| Results Drawn | Results Picked | Prize ($) |
|---|---|---|
| 10 | 11 | 10,000 |
| 9 | 11 | 7,500 |
| 8 | 11 | 2,500 |
| 7 | 11 | 75 |
| 6 | 11 | 0 |
| 5 | 11 | 0 |
| 4 | 11 | 0 |
| 3 | 11 | 0 |
| 2 | 11 | 0 |
| 1 | 11 | 0 |
| 0 | 11 | 0 |
| 12 | 12 | 25,000 |
| 11 | 12 | 12,500 |
| 10 | 12 | 10,000 |
| 9 | 12 | 7,500 |
| 8 | 12 | 750 |
| 7 | 12 | 20 |
| 6 | 12 | 0 |
| 5 | 12 | 0 |
| 4 | 12 | 0 |
| 3 | 12 | 0 |
| 2 | 12 | 0 |
| 1 | 12 | 0 |
| 0 | 12 | 0 |
| 13 | 13 | 25,000 |
| 12 | 13 | 15,000 |
| 11 | 13 | 12,500 |
| 10 | 13 | 10,000 |
| 9 | 13 | 3,500 |
| 8 | 13 | 300 |
| 7 | 13 | 0 |
| 6 | 13 | 0 |
| 5 | 13 | 0 |
| 4 | 13 | 0 |
| 3 | 13 | 0 |
| 2 | 13 | 0 |
| 1 | 13 | 0 |
| 0 | 13 | 0 |

This payout table is used in certain embodiments to determine how much to pay players for correctly picking a certain number of the picks they make. Accordingly, if a player picks 13 numbers and only 7 of the numbers are drawn during the game, then the player wins nothing; but if 10 of the numbers are drawn, then the player wins 10,000 dollars. In addition to odds for how many cards are correctly picked, there can also be odds for particular combinations of cards being picked such as two, three or four of a kind of card, a flush, a straight, a full house, a straight flush, a royal flush or more than one of any of these or any other possible hand, because 13 cards are available. So, for example, for a royal flush, the house could pay 5,000 dollars, but for two royal flushes in the same draw the house could pay a house limit such as 25,000 dollars. A set of the variety of outcomes upon which betting is allowed in one embodiment includes the following outcomes:

1-Card marked through 13-Cards marked.

Two Pairs, Three Pairs, Four Pairs, Five Pairs, Six Pairs (pick suite or any suite).

One, two, three, or four sets of Three of a Kind (pick suite or any suite).

Straight; one five card or two sets of five cards.

One or two sets of 5-cards Flush (pick suite or any suite).

1 or 2 sets of a 5-card Full House (pick suite or any suite).

1 or 2 sets of Four of a Kind (pick suite or any suite).

1 or 2 sets of a 5-card Straight Flush (pick suite or any suite).

1 or 2 sets of a 5-card Royal Flush (any suite).

1-Card marked through 13-Cards marked.

1, 5-card Royal Flush (any suite).

2 sets, 5-card Royal Flush (any suite).

This, however, is only one exemplary set of the possible bets allowed and any variety of bets on a combination of possible outcomes can be used. As described above with respect to craps and roulette, any method of shuffling can be used for simulating the game of keno with cards and many variations of the set or sets of cards used can be employed. The cards can either be shuffled by hand or by an automatic shuffler. Any shuffler described above, as well as any other shuffler, can be used. Additionally, the cards can be shuffled manually. The shuffler can dispense one card at a time or any number of cards at a time up to the amount of cards being drawn in the particular game. If thirteen cards are drawn for a game, then up to 13 cards can be dispensed at a time by the shuffler. As mentioned before, this form of simulating keno with cards can also be practiced as a video game, or a video poker game.

The selected cards for each of the games disclosed herein can be randomized, or shuffled and tracked manually or by a microprocessor (not shown) and software configured to track the selected cards as they are drawn. Functional modules representing the various functions performed by each system can be implemented as necessary to embody the games described. The various modules, as can be appreciated by one of ordinary skill in the art, comprise various sub-routines, procedures, definitional statements, hardware componentry and macros. Each of the software modules are typically separately compiled and linked into a single executable program. Therefore, the description of the modules is used for convenience to describe the functionality of the system. Thus, the processes that are undergone and the functions performed by each of the modules may be arbitrarily redistributed to one of the other modules, combined together in a single module, or made available in a shareable dynamic link library.

Video display modules are used for video gaming systems and include any video display device including, cathode ray tubes, liquid crystal displays, projection screens, vacuum tube displays, and any other type of display. An input module such as a touch screen, a keypad, buttons or any other input device are used for player instructions and interactions. Generally each system will have some memory and one or more microprocessors for executing the various functions to embody the various games.

The microprocessor can be a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. The microprocessor can be any processor, controller, microcontroller, or state machine. The microprocessor can also be implemented as a combination of computing devices, e.g., a combination of a DSP and a microprocessor, a plurality of microprocessors, one or more microprocessors in conjunction with a DSP core, or any other such configuration. Specifically, the microprocessor can be any conventional general purpose single or multi-chip microprocessor such as a Pentium® processor or its progeny, an AMD Athlon® or its progeny, an Itanium® 64-bit processor or its progeny, a MIPS® processor, a PowerPC® processor or its progeny, or an ALPHA® processor or its progeny. In addition, the processor 1005 may be any conventional special purpose microprocessor such as a digital signal processor as described above.can be any conventional general purpose single- or multi-chip microprocessor such as a Pentium® processor, a Pentium® Pro processor, a 8051 processor, a MPS® processor, a Power PC® processor, or an ALPHA® processor.

The memory may include any storage medium including, but not limited to, RAM memory, DRAM memory, SDRAM memory, flash memory, ROM memory, EPROM memory, EEPROM memory, registers, hard disk, a removable disk, a CD-ROM, a DVD-ROM, or any other form of storage medium. An exemplary storage medium, or memory, is coupled to the microprocessor such that the microprocessor can read information from, and write information to, the memory. In the alternative, the memory may be integral with the microprocessor. The microprocessor and the memory may reside in an ASIC.

Figure 6:
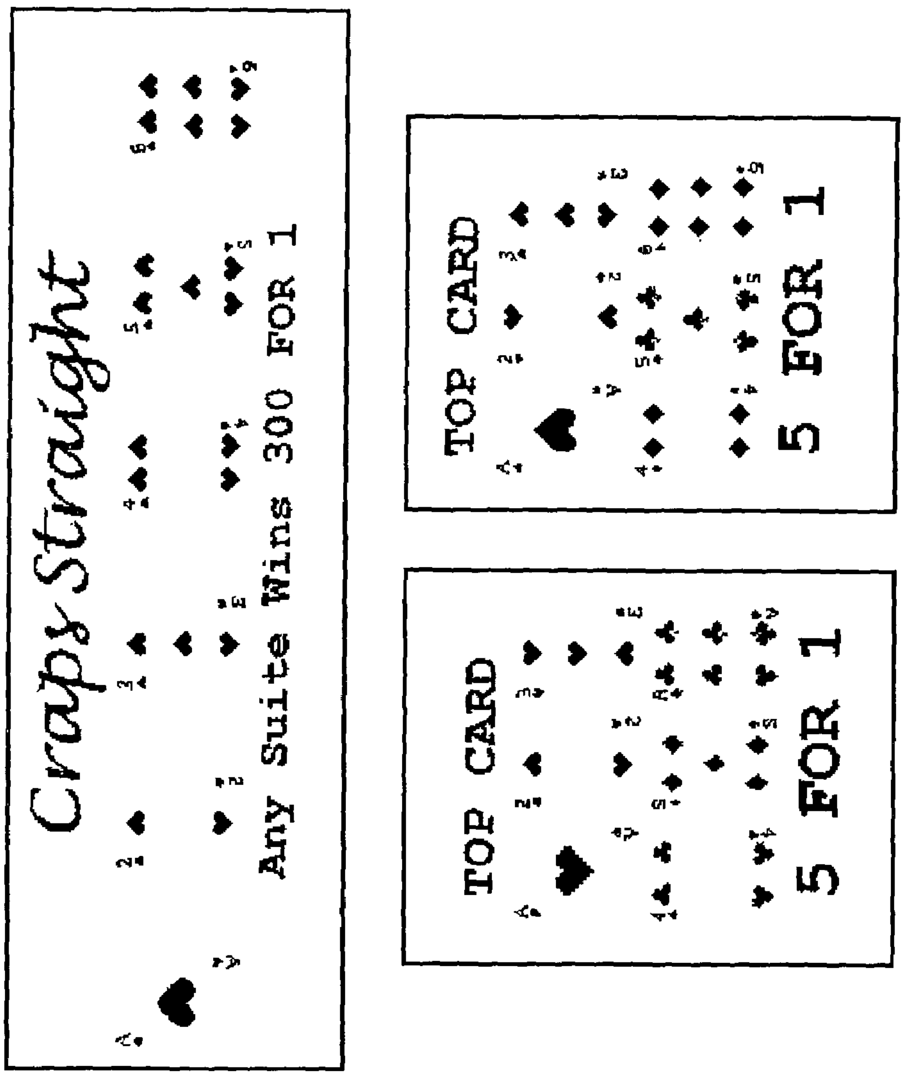
FIG. 6 is a top view drawing of an alternative betting area that can be used in games of chance using cards in one embodiment.

FIG. 6 is a top view drawing of an alternative bet that can be used in games of chance using cards in one embodiment. Although the bets illustrated indicate use with craps, they are provided for illustrative purposes and can be reconfigured as desired for use with other games or other types of bet can be used that may be similar to those illustrated.

Figure 7:
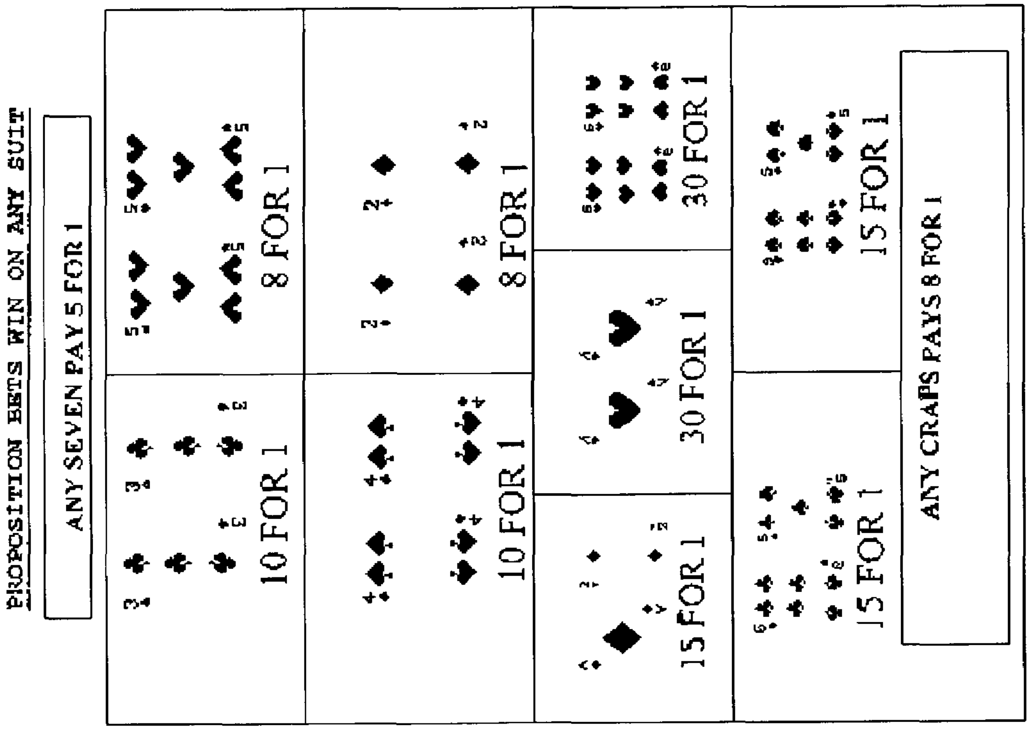
FIG. 7 is a top view drawing of an alternative betting area that can be used in games of chance using cards in one embodiment.

FIG. 7 is a top view drawing of an alternative betting area that can be used in games of chance using cards in one embodiment. Although the example illustrated is geared for use in craps, it is provided for illustrative purposes only, and either it may be reconfigured for use with other games, or other similar betting areas may be designed for use with those games. It is to be understood that any such illustrations provided herein are for illustrative purposes only.

Figure 8:
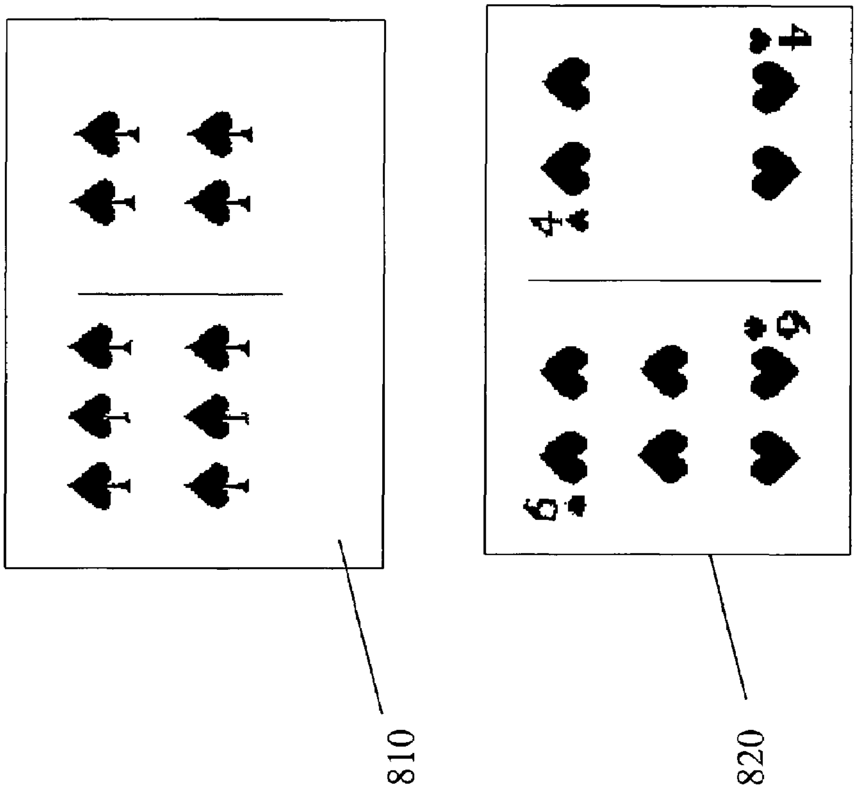
FIG. 8 is a top view drawing of types of cards that can be used to simulate outcomes in one embodiment.

FIG. 8 is a top view drawing of types of cards that can be used to simulate outcomes in one embodiment. FIG. 8 illustrates the use of a card not having numbers 810 and a card that has numbers 820. It is to be understood that these provide only an example of the types of cards that may be used in lieu of standard playing cards and that any alternate design or indicia may be utilized to serve the purpose herein.

The foregoing description details certain embodiments of the invention. It will be appreciated, however, that no matter how detailed the foregoing appears in text, the invention can be practiced in many ways such as by personal video games, video game systems, video poker machines or video slot machines, or the like. Many other games of chance exist where the number of outcomes can be increased by using playing cards instead of the traditional method of selecting the random or pseudo-random outcomes and where bets familiar to people who are familiar with playing cards can be introduced. It should be noted that various automatic shuffle machines, or shufflers, are able to be used for the games described herein and other games disclosed and that any reference to any particular model or patent describing certain ones is merely exemplary and any other shuffler can be used for the purposes described above. Some embodiments will use Shuffle Master's "King" model and some embodiments will use Shuffle Master's "Ace" model for example, but any other models can be used in various embodiments of the invention. Additionally, in embodiments played on a video screen the shuffler can simply be a module operating in the game that can randomize the possible outcomes for each game. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A method of simulating a game of craps using cards, comprising:

using at least one card shuffler to shuffle a set of cards that includes a wildcard;

dispensing a first card from said shuffler to represent the result of a first die that is thrown in craps;

assigning to said wildcard, a value of said first card dispensed from said shuffler, wherein said wildcard corrects a probability of selecting a second card having said value;

dispensing a second card from said shuffler to represent the result of a second die that is thrown in craps;

and determining an outcome from said first and second cards.

2. The method of claim 1, wherein said at least one card shuffler is an automatic card shuffler adapted to continuously shuffle cards and further adapted to dispense at least one card when directed to do so.

3. The method of claim 2, wherein said at least one card shuffler is further adapted to accept said dispensed cards and shuffle them with a plurality of remaining cards still contained in said at least one shuffler.

4. The method of claim 2, wherein said at least one card shuffler is further adapted to indicate when a complete set of cards is present and contained in said card shuffler.

5. The method of claim 1, wherein said set of cards comprises images appearing on a video screen, and wherein said at least one card shuffler is a module adapted to randomize an order that said images representing cards appear on said video screen.

6. The method of claim 5, wherein said video screen further comprises a video slot machine.

7. The method of claim 1, wherein said at least one card shuffler is adapted to dispense from 4 to 6 cards at a time.

8. The method of claim 1, wherein said video screen further comprises a video game system.

9. The method of claim 1, wherein said probability after being corrected is one in six.

10. The method of claim 1, wherein exactly one card shuffler is used.

11. A game apparatus that uses cards to simulate a game of craps, comprising:

a set of cards comprising a wildcard, wherein said wildcard takes a value of a first card selected from said set of cards, wherein said wildcard corrects a probability of selecting a second card having said value;

at least one card shuffler adapted to dispense at least one of said cards representing the face of a die rolled in craps;

a table for placing at least one bet; and a selector adapted to select which of said at least one card is to determine an outcome when more than one card is dispensed.

12. The game apparatus of claim 11, wherein said at least one card shuffler is an automatic card shuffler adapted to continuously shuffle cards and further adapted to dispense at least one card when directed to do so.

13. The game apparatus of claim 12, wherein said at least one card shuffler is further adapted to accept said dispensed cards and shuffle them with a plurality of remaining cards still contained in said at least one shuffler.

14. The game apparatus of claim 12, wherein said at least one card shuffler is further adapted to indicate when a complete set of cards is present and contained in said card shuffler.

15. The game apparatus of claim 11, wherein said set of cards comprise images appearing on a video screen, and wherein said at least one card shuffler is a module adapted to randomize an order that said images representing cards appear on said video screen.

16. The game apparatus of claim 15, wherein said video screen further comprises a video slot machine.

17. The game apparatus of claim 11, wherein said at least one card shuffler is adapted to dispense from 4 to 6 cards at a time.

18. The game apparatus of claim 11, wherein video screen further comprises a video game system.

19. The game of claim 11, wherein said probability after being corrected is one in six.

20. The method of claim 11, wherein exactly one card shuffler is used.

21. A method of simulating a game of craps using cards, comprising:

shuffling a set of cards comprising a wildcard;

dispensing a first card from said set of cards to represent the result of a first die that is thrown in craps;

assigning to said wildcard, a value of said first card, wherein said wildcard corrects a probability of selecting a second card having said value;

dispensing a second card from said set of cards to represent the result of a second die that is thrown in craps.

22. The method of claim 21 wherein said shuffling comprises using an automatic shuffler.

23. The method of claim 21 wherein said set of cards comprises images on a video screen and said shuffling is performed by a computer module adapted to randomize an order that said images representing cards appear on said video screen.

24. The method of claim 21, wherein said probability after being corrected is one in six.

25. The method of claim 21, wherein exactly one card shuffler is used.

* * * * *